United States Patent [19]

Sato et al.

[11] 4,182,279
[45] Jan. 8, 1980

[54] COMBUSTION CHAMBER OF AN INTERNAL COMBUSTION ENGINE

[75] Inventors: Katsujiro Sato, Toyota; Kiyoshi Nakanishi; Takeshi Okumura, both of Susono, all of Japan

[73] Assignee: Toyota Jidosha Kogyo Kabushiki Kaisha, Aichi, Japan

[21] Appl. No.: 859,565

[22] Filed: Dec. 12, 1977

[30] Foreign Application Priority Data

Dec. 16, 1976 [JP] Japan .................. 51-167732[U]

[51] Int. Cl.² .................................... F02B 23/08
[52] U.S. Cl. ............................ 123/30 C; 123/191 S; 123/193 H
[58] Field of Search ......... 123/191 M, 191 S, 191 SP, 123/193 R, 193 H, 193 CH, 193 P, 193 CP, 30 C

[56] References Cited

U.S. PATENT DOCUMENTS

| 2,736,306 | 2/1956 | McDuffie et al. | 123/191 M |
| 2,827,892 | 3/1958 | McDuffie et al. | 123/191 M |
| 2,843,103 | 7/1958 | Wyczalek | 123/191 R |
| 3,154,061 | 10/1964 | Henry-Biabaud | 123/191 M |
| 3,799,140 | 3/1974 | Vogelsang et al. | 123/191 S |
| 4,041,923 | 8/1977 | Konishi et al. | 123/191 S |

FOREIGN PATENT DOCUMENTS

| 1239469 | 7/1960 | France | 123/191 M |
| 2501518 | 7/1976 | Fed. Rep. of Germany | 123/193 P |

*Primary Examiner*—Charles J. Myhre
*Assistant Examiner*—Craig R. Feinberg
*Attorney, Agent, or Firm*—Stevens, Davis, Miller & Mosher

[57] ABSTRACT

Disclosed is a combustion chamber of an internal combustion engine. A first raised portion having a flat bottom is formed on the inner wall of the cylinder head so that a first flat squish area is formed between the flat bottom of the first raised portion and the flat peripheral portion of the top face of the piston. A second raised portion is formed on the top face of the piston at a position opposite to the first raised portion with respect to the axis of the piston and has a spherical rear wall so that a second spherical shell shape squish area is formed between the inner wall of the cylinder head and the rear wall of the first raised portion. The first squish flow spouted out from the first squish area moves forward along the top face of the piston. The second squish flow spouted from the second squish area moves forward in the upper interior of the combustion chamber in the direction opposite to the spouting direction of the first squish flow. The first and second squish flows cooperate with each other to create a strong swirl motion rotating about a horizontal axis in the combustion chamber.

15 Claims, 10 Drawing Figures

COMBUSTION CHAMBER OF AN INTERNAL COMBUSTION ENGINE

DESCRIPTION OF THE INVENTION

The present invention relates to a combustion chamber of an internal combustion engine.

In order to increase the burning velocity and thereby obtain a stable combustion, various modifications of the combustion chamber of an engine have been proposed. As one of the methods of increasing the burning velocity, there has been known a method wherein a squish area is formed between the top face of the piston and the inner wall of the cylinder head. The squish area results in a squish flow being spouted out from the squish area in the radial direction of the cylinder at the end of the compression stroke, so that the squish flow causes turbulence of the combustible mixture in the combustion chamber, thereby causing the turbulent burning.

While an object of the present invention is to provide an improved combustion chamber capable of creating a squish flow, the function of the squish flow created in the combustion chamber according to the present invention is quite different from that of the squish flow created in a conventional combustion chamber. That is, an object of the present invention is to provide a combustion chamber of a novel construction capable of creating a turbulence in the combustion chamber and, at the same time, creating a strong swirl motion rotating about a horizontal axis by the squish flow so that the burning velocity is increased and, at the same time, the quench layer formed on the top face of the piston and on the inner walls of the cylinder and the cylinder head is peeled off by the strong swirl motion, thereby reducing the amount of unburned HC, and CO components in the exhaust gas. As a result of this, in the present invention, since a squish flow and a strong swirl motion are caused, a stable combustion can be obtained even if a lean air-fuel mixture or a mixture containing a large amount of recirculated exhaust gas therein is used.

According to the present invention, there is provided an internal combustion engine comprising: a cylinder block having a cylinder bore therein; a cylinder head mounted on said cylinder block and having an inner wall; a first raised portion having on its lower end a flat bottom face and formed on the periphery of the inner wall of said cylinder head so as to project downwards; a piston reciprocally movable in said cylinder bore and having a top face which has a flat peripheral portion approachable to said flat bottom face so as to create a first squish area therebetween at the end of the compression stroke for spouting out a first squish flow along the top face of said piston, the inner wall of said cylinder head and the top face of said piston defining a combustion chamber therebetween; an intake valve movably mounted on said cylinder head for leading a combustible mixture into said combustion chamber; an exhaust valve movably mounted on said cylinder head for discharging exhaust gas into the atmosphere; a second raised portion formed on the top face of said piston at a position opposite to said first raised portion with respect to an axis of said piston and having a rear face and a front face exposed to said combustion chamber, said rear face being approachable to the inner wall of said cylinder head so as to create a second squish area therebetween at the end of the compression stroke for spouting out a second squish flow which moves forwards in the upper interior of said combustion chamber in the direction opposite to the spouting direction of said first squish flow, said first and second squish flows cooperating with each other to create a strong swirl motion rotating about a horizontal axis in said combustion chamber; and a spark plug having a spark gap located in said combustion chamber.

The present invention may be more fully understood from the description of preferred embodiments of the invention set forth below, together with the accompanying drawings.

DESCRIPTION OF PREFERRED EMBODIMENTS

Figure 1:
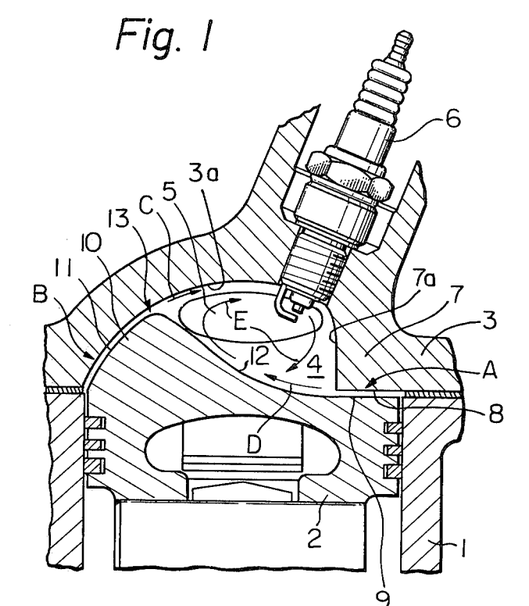
FIG. 1 is a cross-sectional side view of an embodiment of an engine according to the present invention.
Figure 2:
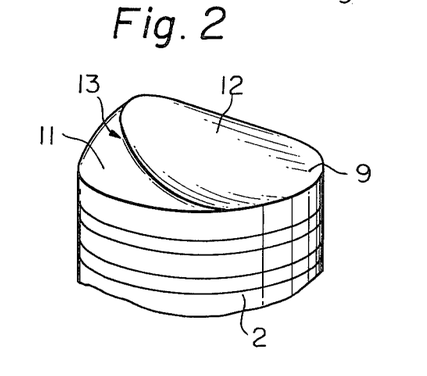
FIG. 2 is a perspective view of the piston shown in FIG. 1.

Referring to FIG. 1, 1 designates a cylinder block, 2 a piston, 3 a cylinder head, 4 a combustion chamber formed between the piston 2 and the cylinder head 3, 5 an intake valve and 6 a spark plug. In addition, an exhaust valve (not shown) is arranged in the cylinder head 3. The cylinder head 3 has a semi-spherical inner wall 3a and a raised portion 7 projecting downwards is formed in one piece on the periphery of the inner wall 3a. The bottom face 8 of the raised portion 7 is formed into a flat surface. The peripheral portion 9 of the top face of the piston 2, which faces the bottom face 8 of the raised portion 7, is also formed into a flat surface so that a flat squish area A is formed between the flat bottom portion 8 of the raised portion 7 and the flat peripheral portion 9 of the top face of the piston 2. On the other hand, a raised portion 10 is formed in one piece on the top face of the piston 2 at a position opposite to the flat peripheral portion 9 with respect to the axis of the piston 2. This raised portion 10 has a spherical rear face 11 having a complementary shape relative to the semi-spherical inner wall 3a of the cylinder head 3, so that a spherical shell shape squish area B is formed between the rear face 11 of the raised portion 10 and the inner wall 3a of the cylinder head 3. The front face 12 of the raised portion 10, which is exposed to the combustion chamber 4, is formed into a slightly concave surface connected smoothly to the flat peripheral portion 9 and extending from the flat peripheral portion 9 to a ridge 13 of the raised portion 10. FIG. 2 shows a perspective view of the piston 2. As is shown in FIG. 2, the ridge 13 of the raised portion 10 has a rounded surface.

In operation, at the time of the intake stroke, a lean air-fuel mixture, or a mixture containing a large amount of the recirculated exhaust gas therein, is introduced into the combustion chamber 4 via the intake valve 5. Then, at the end of the compression stroke, the squish flows of the combustible mixture indicated by the arrows D and C are spouted out from the squish areas A and B, respectively. The squish flow C moves forward along the inner wall 3a of the cylinder head 3, while the squish flow D moves forward along the front face 12 of the raised portion 10. Then, the squish flow C moves downwards along the vertical side wall 7a of the raised portion 7. On the other hand, the flow direction of the squish flow D is deflected at a position near the ridge 13 of the raised portion 10 and, then, the squish flow D moves forward along the inner wall 3a of the cylinder head 3. As a result of this, a strong swirl motion rotating about a horizontal axis and indicated by the arrow E is created in the combustion chamber 4.

When the combustible mixture is ignited by the spark plug 6, since turbulence and a strong swirl motion of the combustible mixture are caused in the combustion chamber 4 by the squish flows C and D as mentioned above, turbulent burning is carried out. In addition, since the flame of the combustible mixture ignited by the spark plug 6 moves forward together with the swirl motion E and, thus, rapidly propagates over the entire space of the combustion chamber 4, the burning velocity is increased. Consequently, due to the occurrence of the turbulent burning and the considerable increase in the burning velocity caused by the rapid propagation of the flame, a stable combustion can be obtained. On the other hand, when the piston 2 starts the downward movement thereof at the time of the intake stroke, a gas stream flowing towards the squish areas A and B in the direction opposite to the squish flows C and D is caused in the combustion chamber 4. This gas stream causes a strong turbulence of the combustible mixture introduced into the combustion chamber 4 via the intake valve 5 and, as a result, the air-fuel ratio of the combustible mixture becomes uniform at any region in the combustion chamber 4. Consequently, even if a mixture, the flame speed of which is low, such as a lean air-fuel mixture or a mixture containing a large amount of the recirculated exhaust gas therein is used, the burning velocity is increased by the squish flow and the strong swirl motion and, as a result, a stable combustion can be obtained.

As mentioned above, since a stable combustion of a lean air-fuel mixture can be obtained, the amount of harmful HC, CO and $NO_x$ components in the exhaust gas can be simultaneously reduced. In addition, since a stable combustion of a mixture containing a large amount of the recirculated exhaust gas therein can be obtained, the amount of harmful $NO_x$ components in the exhaust gas can be reduced. Furthermore, since the quench layer formed on the inner wall 3a of the cylinder head 3 and on the front face 12 of the raised portion 10 is peeled off by the squish flows C and D, the amount of unburned HC and CO components produced in the combustion chamber 4 can be reduced.

Figure 3:
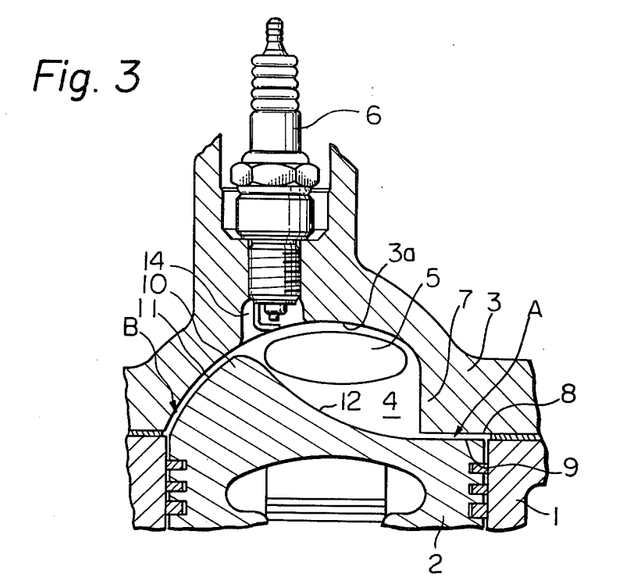
FIG. 3 is a cross-sectional side view of another embodiment according to the present invention.

If the electrode of the spark plug 6 is arranged at a position wherein the strong squish flows C and D directly impinge upon the electrode of the spark plug 6, there is a danger that a misfire will occur. In order to avoid this danger, in this embodiment, the electrode of the spark plug 6 is arranged near the side wall 7a of the raised portion 7 at a position remote from the squish area B. On the other hand, in the case wherein the electrode of the spark plug 6 needs to be arranged near the squish area B as shown in FIG. 3, it is preferable that a recess 14 be formed on the inner wall 3a of the cylinder head 3 and the electrode of the spark plug 6 be disposed in the recess 14, so that the strong squish flow does not directly impinge upon the electrode of the spark plug 6.

Figure 4:
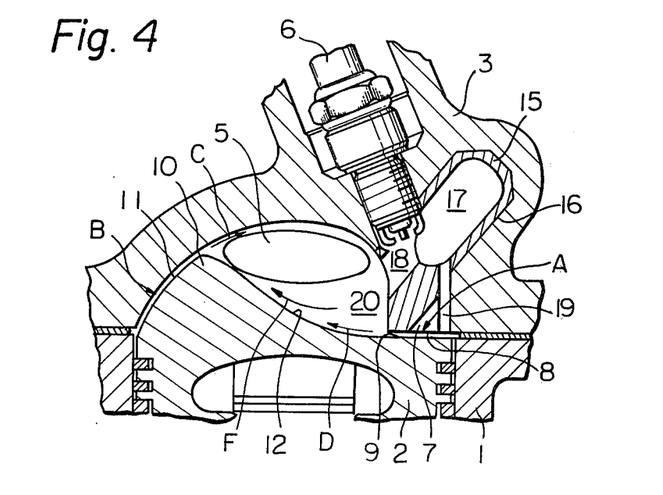
FIG. 4 is a cross-sectional side view of a further embodiment according to the present invention.

FIG. 4 shows the case wherein the present invention is applied to an internal combustion engine with an auxiliary combustion chamber. Referring to FIG. 4, 15 designates an auxiliary chamber component press-fitted into a recess 16 formed on the inner wall 3a of the cylinder head 3; 17 designates an auxiliary combustion chamber formed in the auxiliary chamber component 15; and 18 designates a connecting passage communicating the auxiliary combustion chamber 17 and a main combustion chamber 20, and formed in the auxiliary chamber component 15. In this embodiment, the cylinder head 3 has a semi-spherical inner wall 3a having the same shape as the inner wall 3a shown in FIG. 1.

In this engine, at the time of the intake stroke, a lean air-fuel mixture, or a mixture containing a large amount of the recirculated exhaust gas therein, is introduced into the main combustion chamber 20 via the intake valve 5. Then, at the time of the compression stroke, the combustible mixture in the main combustion chamber 20 is forced into the auxiliary combustion chamber 17 via the connecting passage 18. In the same manner as described with reference to FIG. 1, a strong swirl motion is caused in the main combustion chamber 20 by the squish flows C and D at the end of the compression stroke. At the same time, the combustible mixture forced into the auxiliary combustion chamber 17 is ignited by the spark plug 6 located in the connecting passage 18 and, as a result, a strong burning jet is injected from the connection passage 18 into the main combustion chamber 20. Thus, the combustible mixture swirling in the main combustion chamber 20 is ignited by the burning jet. In this embodiment, the burning velocity in the main combustion chamber 20 is further increased due to the fact that the burning jet further strengthens the tubulence and the swirl motion. In addition, in this embodiment, the connecting passage 18 is so arranged that the angle between the flow direction of the burning jet injected from the connecting passage 18 and the flow direction of the squish flow D spouted out from the squish area A is an acute angle, as shown in FIG. 4. Consequently, the flow direction of the burning jet is deflected in the direction F at a position near the front face 12 of the raised portion 10 by the squish flow D, so that the burning jet does not directly impinge upon the front face 12 of the raised portion 10. As a result of this, since the burning jet is not cooled by the piston 2, it is possible to eliminate the disadvantage that the burning jet is weakened.

In addition, as is shown in FIG. 4, an additional connecting passage 19 may be formed in the cylinder head 3. The upper open end of the additional connecting passage 19 opens into the auxiliary combustion chamber 17, while the lower open end of the additional connecting passage 19 opens into the squish area A at the bottom face 8 of the raised portion 7. In this embodiment, when the piston 2 reaches an approximate top dead center, the combustible mixture in the squish area A is forced into the auxiliary combustion chamber 17 and causes the turbulence of the combustible mixture in the auxiliary combustion chamber 17. As a result of this, when the combustible mixture in the auxiliary combustion chamber 17 is ignited by the spark plug 6, turbulent burning is caused and, thus, the burning velocity in the auxiliary combustion chamber 17 can be increased.

Figure 5:
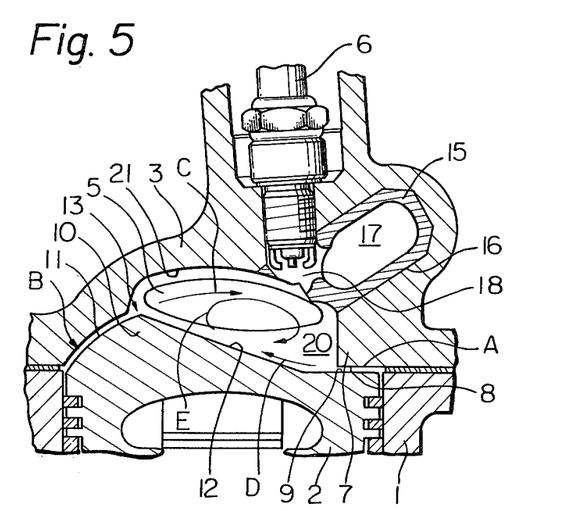
FIG. 5 is a cross-sectional side view of a still further embodiment according to the present invention.

FIG. 5 shows another embodiment of the engine shown in FIG. 4. In FIG. 5, similar components are indicated by the same reference numerals as used in FIG. 4. In this embodiment, as is shown in FIG. 5, a depression 21 is formed on the inner wall of the cylinder head 3, so that the bottom of the depression 21 is upwardly recessed from the extension of the curved surface defining the spherical shell shape squish area B. In addition, this depression 21 is arranged to extend from a position near the ridge 13 of the raised portion 10 to a position near the opening of the connecting passage 18 so that the squish flow C spouted out from the squish area B is not disturbed by the bottom of the depression 21. In addition, the connecting passage 18 is arranged on a plane along which the squish flow C moves forward so that the squish flow B flows into the connecting passage 18. The raised portion 10 has a flat front face 12, and the opening of the connecting passage 18 is directed to the central portion of the flat front face 12, so that an angle between the flow direction of the burning jet injected from the connecting passage 18 and the flow direction of the squish flow D spouted out from the squish area A is an acute angle.

Figure 6:
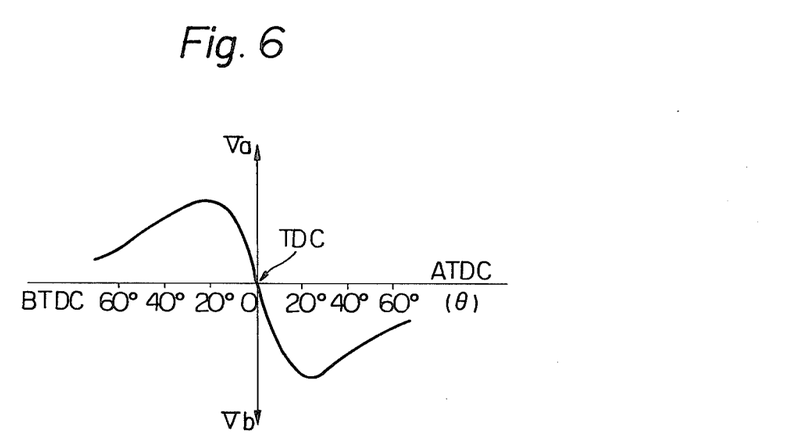
FIG. 6 is a graph showing the change in the velocity of the squish flow.

FIG. 6 shows the velocity of the squish flow C, which is measured in the main combustion chamber 20 at a postion near the ridge 13 of the raised portion 10. In FIG. 6, the ordinate indicates the velocity Va of the squish flow flowing in the direction shown by the arrow C in FIG. 5, and the velocity Vb of the gas stream flowing towards the squish area B in the direction opposite to that shown by the arrow C. The abscissa indicates a crank angle θ. From FIG. 6, it will be understood that the spouting operation of the squish flow C shown in FIG. 5 is started approximately 60 degrees before top dead center and, then, the velocity Va of the squish flow C becomes maximum approximately 20 degrees before top dead center. In addition, as is shown in FIG. 6, the maximum velocity Vb of the gas stream is slightly higher than the maximum velocity Va of the squish flow C.

When the piston 2 starts the downward movement thereof at the time of the intake stroke, the gas stream flowing at a high speed towards the squish areas A and B, in the direction opposite to that shown by the arrows C and D, is created and causes a strong turbulence of the combustible mixture introduced into the main combustion chamber 20. As a result of this, the air-fuel ratio of the combustible mixture becomes uniform at any region in the main combustion chamber 20. In addition, in the case wherein an air-fuel mixture introduced into the main combustion chamber 20 contains a large amount of the recirculated exhaust gas therein, a satisfactory mixing operation between the air-fuel mixture and the recirculated exhaust gas is effected in the main combustion chamber due to the strong turbulence caused by the above-mentioned gas stream. Then, at the time of the compression stroke, when the piston 2 reaches approximately top dead center, the squish flows C and D are spouted out from the squish areas B and A, respectively, to cause a strong swirl motion shown by the arrow E in the main combustion chamber 20. In addition, a part of the squish flow C spouted out from the squish area B flows into the connecting passage 18 at a relatively high speed to cause a microturbulence in the connecting passage 18. Since the microturbulence is created in the connecting passage 18, when the spark plug 6 is operated, the combustible mixture in the connecting passage 18 is easily ignited by the spark plug 6 and, then, the flame of the combustion mixture thus ignited rapidly propagates into the auxiliary combustion chamber 17. As a result of this, the combustible mixture in the auxiliary combustion chamber 17 is rapidly burned to inject a strong burning jet into the main combustion chamber 20. Consequently, the burning velocity in the main combustion chamber 20 is considerably increased because the turbulence and the strong swirl motion are further strengthened by the burning jet. In addition, since the connecting passage 18 is so arranged that the angle between the flow direction of the burning jet and the flow direction of the squish flow D is an acute angle, the flow direction of the burning jet is deflected by the squish flow D as mentioned previously. As a result of this, since the burning jet is prevented from being cooled by the piston 2, it is possible to avoid the danger that the burning jet is weakened. Furthermore, the burning jet swirls in the main combustion chamber 20 together with the combustible mixture swirling about a horizontal axis and, as a result, the unburned HC and CO components in the quench layer formed on the inner wall of the cylinder head 3 and the front face 12 of the raised portion 10 are burned. Then, at the time of the power stroke, when the piston 2 starts the downward movement thereof, a part of the burning gas in the main combustion chamber 20 is sucked into the squish areas A and B, as a result, the unburned HC and CO components in the quench layer formed on the walls of the cylinder head 3 and the piston 2, which are located within the squish areas A and B, are burned. In addition, the burning gas in the auxiliary combustion chamber 17 is sucked into the main combustion chamber 20 via the connecting passage 18 due to the flow of the gas sucked into the squish area B and the burning gas sucked into the main combustion chamber 20, that is, the burning jet further causes the turbulence of the unburned gas and burns the unburned gas remaining in the main combustion chamber 20. In this embodiment, since the length of time during which the burning jet continues to be injected is elongated as compared with that in a conventional engine, the burning velocity is considerably increased.

Figure 7:
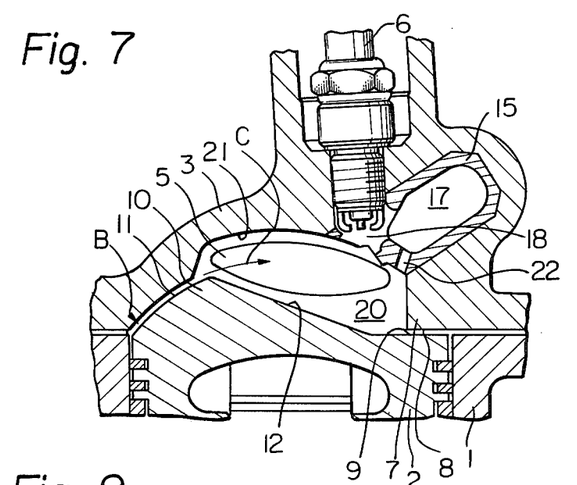
FIG. 7 is a cross-sectional side view of another embodiment of the engine shown in FIG. 5.

FIG. 7 shows a further embodiment of the engine shown in FIG. 5. Referring to FIG. 7, an additional connecting passage 22 communicating the auxiliary combustion chamber 17 and the main combustion chamber 20 is formed in the auxiliary chamber component 15 and arranged so that the opening of the additional connecting passage 22 is directed to the region of the main combustion chamber 20, which is located near the raised portion 7. In this embodiment, when a part of the squish flow C spouted out from the squish area B at the end of the compression stroke flows into the auxiliary combustion chamber 17 via the connecting passage 18, the residual exhaust gas in the auxiliary combustion chamber 17 is accordingly discharged into the main combustion chamber 20 via the additional connecting passage 22 and, thus, the inside of the auxiliary combustion chamber 17 is scavenged. Then, after ignition, since a burning jet is injected from the additional connecting passage 22 towards the combustible mixture located at a region wherein the burning jet injected from the connecting passage 18 cannot reach, the burning jets cause the ignition of the combustible mixture located over the entire space of the main combustion chamber 20.

Figures 8, 9:
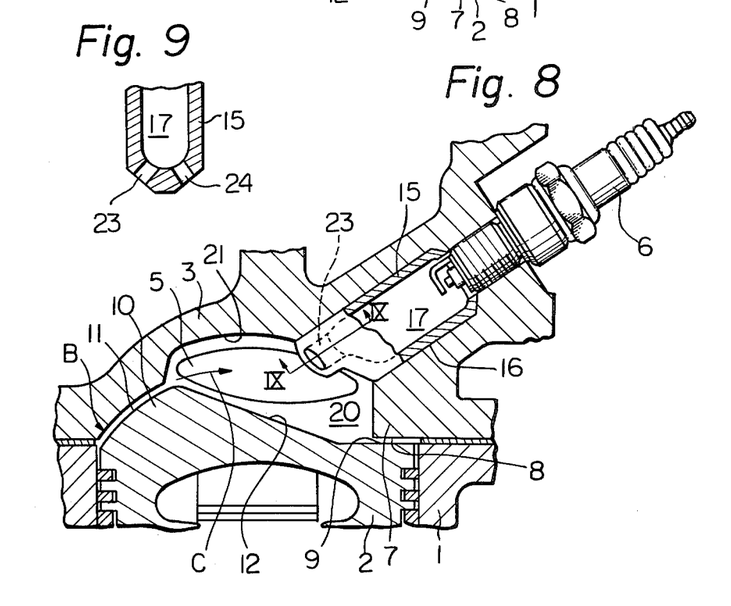
FIG. 8 is a cross-sectional side view of a further embodiment of the engine shown in FIG. 5.
FIG. 9 is a cross-sectional view taken along the line IX—IX in FIG. 8.

FIG. 8 shows a still further embodiment of the engine shown in FIG. 5. Referring to FIGS. 8 and 9, a pair of connecting passages 23 and 24, each of which communicates the auxiliary combustion chamber 17 with the main combustion chamber 20, is formed in the auxiliary chamber component 15. As is shown in FIG. 9, the connecting passages 23 and 24 are symmetrically arranged with respect to the symmetrical vertical plane of the main combustion chamber 20, and the opening of the connecting passages 23 and 24 are directed in opposite directions. In addition, the electrode of the spark plug 6 is arranged in the deep interior of the auxiliary combustion chamber 17. In this embodiment, since a part of the squish flow C spouted out from the squish area B at the end of the compression stroke flows into the auxiliary combustion chamber 17 to scavenge the inside thereof, easy ignition can be obtained even if the electrode of the spark plug 6 is arranged in the deep interior of the auxiliary combustion chamber 17. In addition, since the burning jet is injected towards the entire space of the main combustion chamber 20 via a pair of the connecting passages 23 and 24, the burning velocity is further increased.

Figure 10:
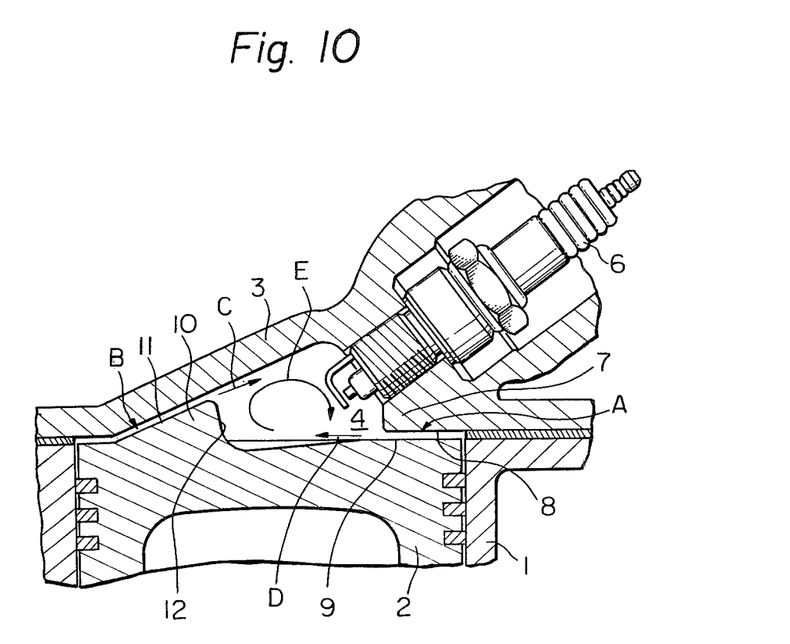
FIG. 10 is a cross-sectional side view of a still further embodiment according to the present invention.

FIG. 10 shows the case wherein the present invention is applied to a wedge shape combustion chamber 4. Since the operation in this embodiment is the same as that in the engine shown in FIG. 1 the description of the operation is omitted.

According to the present invention, since the quench layer formed on the inner wall of the cylinder head and on the top face of the piston is peeled off by the squish flows along the inner wall of the cylinder head and the top face of the piston, the amount of unburned HC and CO components produced in the combustion chamber can be reduced. In addition, since the turbulence and strong swirl motion are created by the above-mentioned squish flows, the burning velocity can be increased and, thus, a stable combustion can be obtained even if a mixture, the flame speed of which is low, such as a lean air-fuel mixture or a mixture containing a large amount of the recirculated exhaust gas therein, is used.

While the inventions have been described by reference to specific embodiments chosen for purposes of illustration, it should be apparent that numerous modifications could be made thereto by those skilled in the art without departing from the spirit and scope of the invention.

What is claimed is:

1. An internal combustion engine compsiring:
   a cylinder block having a cylinder bore therein;
   a cylinder head mounted on said cylinder block and having an inner wall;
   a first raised portion having on its lower end a flat bottom face and formed on the periphery of the inner wall of said cylinder head so as to project downwards;
   a piston reciprocally movable in said cylinder bore and having a top face which has a flat peripheral portion approachable to said flat bottom face so as to create a first squish area therebetween at the end of the compression stroke for spouting out a first squish flow along the top face of said piston, the inner wall of said cylinder head and the top face of said piston defining a combustion chamber therebetween, said combustion chamber comprising a main combustion chamber and an auxiliary combustion chamber which are interconnected to each other via a connection passage;
   an intake valve movably mounted on said cylinder head for leading a combustible mixture into said combustion chamber;
   an exhaust valve movably mounted on said cylinder head for discharging exhaust gas into the atmosphere;
   a second raised portion formed on the top face of said piston at a position opposite to said first raised portion with respect to an axis of said piston and having a rear face and a front face exposed to said combustion chamber, said rear face being approachable to the inner wall of said cylinder head so as to create a second squish area therebetween at the end of the compression stroke for spouting out a second squish flow which moves forwards in the upper interior of said combustion chamber in a direction opposite to the spouting direction of said first squish flow, said first and second squish flows cooperating with each other to create a strong swirl motion rotating about a horizontal axis in said combustion chamber;
   a depression formed on the inner wall of said cylinder head, a bottom of said depression being upwardly recessed from the extension of a curved surface defining said second squish area so that said bottom does not disturb said second squish flow, said depression extending from a position near the opening of said connecting passage to a position near a ridge of said second raised portion; and
   a second spark plug having a spark gap located in said combustion chamber.

2. An internal combustion engine as claimed in claim 1, wherein said spark plug is arranged at a position wherein the spark gap thereof is not directly exposed to the strong streams of said first and second squish flows.

3. An internal combustion engine as claimed in claim 1, wherein said first raised portion has a horizontally flat bottom face and an approximately vertical side wall exposed to said combustion chamber, said first squish area extending in a horizontal plane.

4. An internal combustion engine as claimed in claim 1, wherein said connecting passage is arranged in a plane along which said second squish flow moves forward.

5. An internal combustion engine as claimed in claim 1, wherein the spark gap of said spark plug is located in said connecting passage.

6. An internal combustion engine as claimed in claim 1, wherein the spark gap of said spark plug is located in the deep interior of said auxiliary combustion chamber.

7. An internal combustion engine as claimed in claim 1, wherein the front face of said second raised portion is smoothly connected to the flat peripheral portion of the top face of said piston.

8. An internal combustion engine as claimed in claim 7, wherein the front face of said second raised portion is formed so as to be slightly concave.

9. An internal combustion engine as claimed in claim 7, wherein the front face of said second raised portion is formed so as to be flat.

10. An internal combustion engine as claimed in claim 1, wherein the opening of said connecting passage is arranged to be directed to the top face of said piston so that an angle between the flow direction of a burning jet injected from said connecting passage and the flow direction of said first squish flow is an acute angle.

11. An internal combustion engine as claimed in claim 10, wherein the opening of said connecting passage is directed to the central portion of the front face of said second raised portion.

12. An internal combustion engine as claimed in claim 10, wherein said connecting passage comprises a pair of holes which are symmetrically arranged with respect to a symmetrical vertical plane of said main combustion chamber, the openings of said holes being directed in opposite directions.

13. An internal combustion engine as claimed in claim 1, wherein said engine further comprises an additional connecting passage communicating said auxiliary combustion chamber with said main combustion chamber.

14. An internal combustion engine as claimed in claim 13, wherein the opening of said additional connecting passage is directed to the region of said main combustion chamber, which is located near said first raised portion.

15. An internal combustion engine as claimed in claim 13, wherein said additional connecting passage opens into said first squish area.

* * * * *